United States Patent Office 3,393,188
Patented July 16, 1968

3,393,188
POLYMERIC FILMS HAVING MOISTURE VAPOR TRANSMISSION PROPERTIES AND A METHOD OF PREPARING THE SAME
Richard Strauss, Lexington, Charles P. Riley, Jr., Chelmsford, and Henry R. Lasman, Wilmington, Mass., assignors to National Polychemicals, Inc., Wilmington, Mass., a corporation of Massachusetts
No Drawing. Filed Oct. 20, 1965, Ser. No. 498,992
10 Claims. (Cl. 260—92.8)

Our invention concerns polymeric film materials characterized by enhanced moisture vapor transmisison and a method of preparing these materials. In particular our invention relates to vinyl chloride resin film materials enhanced in moisture vapor transmission by the addition of an aluminum salt of a long chain amphoteric surface active material which contains both a carboxylic group and an N-substituted basic group.

We have discovered that the incorporation of the water insoluble salts of N-substituted amino acid derivatives improve the moisture vapor transmission (MVT) of polymeric film materials. In particular, the addition of the aluminum salts of N-fatty beta-amino mono or di alkanoic acids such as N-fatty beta-imino propionic acid have been found to be non-water extractable additives which increase the MVT of vinyl chloride resin films.

The additives useful for our purpose include those water insoluble salts particularly polyvalent metal salts such as the trivalent metal salts of an N-substituted amino acid particularly those amino acids having a typically balanced or unbalanced amine and carboxylic groups. Breathability of polymeric film materials by the transmission of moisture through pores in the film material is obtained by the use of water insoluble and non-extractable additives. Water-extractable salts may, on testing, appear to enhance the MVT of polymeric films. However, such water-extractable salts create larger size pores which may admit liquid, as well as transmitting vapor and, therefore, would not be acceptable for many purposes. Additionally, the leaching out of water-soluble salts from a polymeric film material often diminishes the strength and usefulness of the polymeric material, particularly if the additive is employed at a rather high concentration level. The water insoluble and non-extractable salts of the amino acids of our invention include a wide variety of metal cations with those white-colored or light-colored salts particularly preferred for use in typical polymeric films. Typical polyvalent metal salts could include those metal cations of tin, lead, zinc, titanium, cadmium, aluminum, barium, magnesium and the like. Some calcium salts are water-extractable and, therefore, are not particularly suited for the purposes of our invention, except in particular situations. The preferred metal cation of our invention comprises aluminum which salts are preferred due to their low or essentially non-water extractability from polymeric film materials. Those trivalent metal salts, such as aluminum in combination with long chain amphoteric amino derivatives having two carboxylic groups give considerable improvements in MVT of polymeric films.

The water-insoluble salts of our invention are derived from N-substituted amino carboxylic acids. These acids, by including one or more amine and carboxylic acid groups, are amphoteric materials. These acids by virtue of the long chain substitution of the N-group are usually good surfactants, and enhance the incorporation of the metal salt into polymeric materials, particularly vinyl resin plastisols. The acid hydrogens or the water-soluble cations such as the sodium, potassium, ammonium or amine salts and the like of the amino acid compounds may be partially or preferable entirely substituted by the metal cations. The nitrogen atom of the amino acid is preferably substituted by a hydrocarbon radical which may be an alkyl radical, like methyl, isopropyl, butyl or a longer chain alkyl radical or a fatty acid radical like lauryl, tallow, coconut oil, oleate, and the like, derived from either natural or synthetic materials. The N-group may be wholly or partially substituted by either hydrocarbon, hydrogen or carboxylic acid radicals. The acidic portion of the organic molecule salts may comprise a mono or di alkanoic or fatty acid group or mixtures thereof. The nitrogen atom may also have a hydrogen or lower alkyl radical when the amino acid contains a mono carboxylic acid group, i.e. be an amino or imino radical.

Water-insoluble salts may be prepared by reacting water-soluble amino acid salts or the acid itself with a desired base such as a base with desired polyvalent metal. Suitable amino acids for such a reaction would include those acids having the general formula as follows:

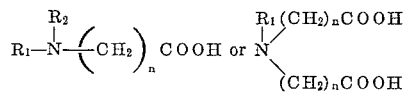

wherein $R_1$ is an alkyl or fatty acid radical, $R_2$ is a hydrogen atom or a lower alkyl radical, and $n$ is an integer of from 0 to 6 or more, such as 1 or 2. Particular amino acids would include N-fatty beta-amino propionic acid and its diadduct N-fatty beta-imino di propionic acid, as well as sarcosinic acids. Specific amino acids and water-soluble salts, from which our additives may be prepared, include those compounds such as sodium, N-coco, beta-amino propionate, disodium N-tallow beta-imino propionate, the partial sodium salt of N-lauryl beta-imino dipropionate, N-lauryl beta-imino propionic acid, as well as the potassium and ammonium salt derivatives. Other compounds would include the sarcosinic acids and its water-soluble salts such as N-methyl amino ethonic acid and its sodium, potassium and ammonium derivatives.

The amount of our metal salt additives to incorporate into polymeric materials may be varied depending upon the type of additive and the degree of MVT desired. Typically, our water-insoluble amino acid salts are used in amount from as low as 5 to as high as 80 or more parts per 100 parts of resin (phr.). Good results are often achieved using from about 20 to 60 parts phr. of our trivalent metal salts of N-substituted amino dicarboxylic acids in vinyl resin films. Our metal salts are usually added to, incorporated into or otherwise blended with the polymeric material prior to the formation of the polymeric material into the foam, film, fiber or other thin sheet or fiber form. Our metal salts may thus be added or disbursed in liquid, paste, emulsions, plastisols, solvent solutions, or into the bulk polymeric resin composition. For example, our metal salts may be blended into a polymer composition on a roller or dispersion mill.

Our additives may be used alone or in combination with other materials and additives such as plasticizers, heat and light stabilizers, antioxidants, curing agents accelerators, inner filler materials, chemical blowing agents, dyes, pigments, lubricants, surfactants, and resins and other materials that do not react with or destroy the water-insoluble or MVT characteristics of the metal salts.

Our polymeric film materials may be employed alone as non-supported cellular or non-cellular solid films where such films have the desired strength. Our film material may be and often is used in laminate structures in combination with other polymeric or fibrous sheet material. Our polymeric film material may be coated, bonded or otherwise secured to or between other film material or fibrous sheet material, such as natural or synthetic woven or non-woven fibers such as cotton, rayon, acrylic fibers, glass fibers, urethane, stretchable fibers, leather and the like. Our polymeric film material, having enhanced MVT characteristics, may also be employed to and between thin sheets of solid or cellular polymeric sheet material, such as vinyl resins, like polyvinylchloride, polyurethane sheet material, rubbers and other breathable or non-breathable film material. Our film material and laminates containing our material may be usefully employed where good MVT properties are particularly desirable or necessary, such as in those applications in which the film is placed in contact with or surrounded by the human body or as a semi-permeable membrane material. Typical uses would include its use in shoe uppers and wearable apparel like raincoats, boots, gloves, protective clothing and the like. For example, solid film polyvinylchloride sheet material, containing our additives, may be used alone or coated on fibrous material or as a portion of a laminate in combination with substantially open cellular vinylchloride resin foam material or with urethane sheet material.

The polymeric materials in which our metal salt additives may be incorporated include those organic polymeric materials which normally form flexible sheet materials and which possess low or poor MVT properties. Typical polymeric materials include those materials having an ASTM MVT of less than about 100. Typical polymeric film materials include natural and synthetic elastomeric polymerizates, such as natural rubber, styrene-butadiene copolymers, ethylene propylene diene modified terpolymers, acrylonitrile-butadiene copolymers, polybutadiene, polyisoprene, butyl rubber and the like. Other polymeric materials include those plasticized and unplasticized thermoplastic resins of both natural and synthetic variety, such as the $C_2$-$C_4$ olefin polymers like polyethylene resins, propylene resins and ethylene-propylene resins. Our additives are particularly useful in increasing the MVT of flexible or vinyl resin materials such as polyvinylchloride, as well as copolymers of vinylchloride with other vinyl esters like vinylacetate, vinylpropionate, vinylidenechloride and the like. Other polymeric material includes acrylonitrile-butadiene-styrene resins, acrylic and modified acrylic resins, polyesters, and particularly urethane polymers. The urethane polymers in which our additives may be employed include those polymers of both the polyester and polyether type and which polymers are flexible and capable of forming thin film materials. Typical urethane polymers are prepared by the reaction of a diisocyanate such as toluene diisocyanate with a source of hydroxyl groups such as polyols like glycerin, sorbitol or with polyesters having free hydroxy groups.

Our invention is illustrated by the following examples:

Example 1.—The aluminum salt or N-tallow beta-imino dipropionic acid was prepared by reacting a sodium salt of the desired acid with a basic aluminum salt. 120 grams of disodium N-tallow beta-imino dipropionate was dissolved in 2500 grams of water at 25° C. 150 grams of aluminum potassium alum was separately prepared by dissolving the alum in 800 grams of water at 25° C. The alum solution was then slowly added to the dipropionate solution with good stirring over a time period of about 45 minutes. A slurry formed containing a white precipitate of the aluminum dipropionic salt. The slurry was stirred for an additional 15 minutes at 25° C. The white precipitate was filtered from the solution on a Buchner funnel with suction and the filter cake washed with 2 liters of warm water at 40° C. The product was then dried at 50° to 60° C. until the moisture content was less than about 0.3% and the product ground to a fine powder which passed entirely through a 40 mesh screen. The powder so prepared was the aluminum salt of N-tallow beta-imino dipropionic acid. Barium, calcium and other salts may be prepared in a similar manner.

Example 2.—A vinylchloride resin film material containing various metal salt additives was prepared by blending the ingredients shown in Formulation A to form a base plastisol mixture. After hand-mixing the ingredients of Formulation A, the mixture is passed through a paint mill until a uniform dispersion results. The metal salt to be blended into the plastisol is first hand-mixed into the base plastisol to insure that all of the dry powder is wet by the plastisol. The plastisol is then passed through a paint mill four times using a gap of 3.0 mils and 1.5 mils. Film coatings are then made on casting paper using a bird or gardner applicator. The drawn down films are placed in an oven for 30 minutes at room temperature and then fused in an air-circulated oven at a temperature of 165° C. for 3 to 3½ minutes.

Formulation A: Parts by weight
A high molecular weight plastisol-grade polyvinylchloride resin _____ 100.0
Dioctylphthalate _____ 100.0
Epoxidized soybean oil _____ 5.0
Oil soluble barium-cadmium-zinc stabilizer __ 2.0
Titanium dioxide _____ 5.0
Synthetic calcium sulfonate _____ 0.5

Example 3.—The aluminum salt of Example 1 and the barium salts similarly prepared were incorporated into the plastisol of Formulation A at a level of 48.5 parts of salt per 100 parts of resin. The vinylchloride films both before and after the addition of the barium and aluminum salts, were tested for MVT properties and the percent of water-extractable salts. The permeability of a film so prepared to transmit water vapor was determined by sealing a 5 inch diameter circle of the film material over a beaker filled with water. The beaker and film were then placed in a constant-humidity box which had been previously charged with magnesium ntirate and water to maintain a relative humidity of about 50% and a temperature of 90° F. (ASTME96–63T,D). The entire cell so prepared was weighed every 24 hours and the weight loss per 24 hours determined. The rates of vapor transmission were then calculated as to the grams of water vapor 24 hours per square meter per mil of film thickness.

The resistance of plastic films to extraction by chemicals by water was tested employing ASTM Method D–1239 Section A (a distilled or deionized water). The specimens were first conditioned at room temperature and then completely immersed in water for 24 hours at room temperature and the weight loss thereafter calculated after the specimen had been dried and conditioned at room temperature. The results of MVT and water extraction tests were as follows:

TABLE I

| Sample | MVT gm./24 hr./M$^2$ | Ratio of MVT to base film | Percent Water Extraction |
| --- | --- | --- | --- |
| Base film of Example 2 | 65.0 | | 0.0 |
| Aluminum Salt of N-tallow beta-imino dipropionic acid | 264.0 | 4.0 | 0.0 |
| Barium Salt of N-tallow beta-imino dipropionic acid | 188.0 | 2.9 | 0.0 |

The results indicate that the aluminum and barium salts enhance the MVT of the vinyl resin film and are not water-extractable.

Example 4.—A plasticized vinylchloride resin film material is enhanced in MVT properties by the addition thereto into the plastisol, prior to the film formation, of about 50 parts per 100 parts of resin of the aluminum salt of N-lauryl sarcosinate. Film material so prepared has an enhanced MVT over the base film and the aluminum salt is essentially non-water extractable.

Our invention, therefore, discloses a means to enhance the MVT properties of polymeric film materials by the addition of certain water insoluble polyvalent metal salts of an N-substituted amino carboxylic acids. Our metal salts enhance the MVT, but are not water-extractable and, therefore will find usefulness in a wide variety of film materials.

What we claim is:

1. A flexible, organic, polymeric film material enhanced in moisture vapor transmission properties by the addition of from about 5 to 80 parts per 100 parts of the polymer by a water-insoluble, polyvalent metal salt consisting essentially of metal cations of tin, lead, zinc, titanium, cadmium, aluminum, barium, and magnesium of a N-substituted amino carboxylic acid having the following general formula:

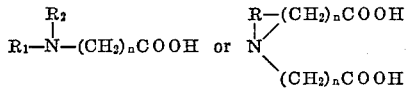

where $R_1$ is an alkyl or fatty acid radical, $R_2$ is a hydrogen atom or lower alkyl radical, and $n$ is an integer of from 0 to 6.

2. The film of claim 1 wherein the metal salt is an aluminum salt.
3. The film of claim 1 wherein the amino acid is an N-fatty imino dicarboxylic acid.
4. the film of claim 1 wherein the polymeric material is a vinyl resin.
5. The film of claim 1 wherein the acid is aluminum salt of N-fatty beta-amino propionic acid.
6. The film material of claim 1 wherein the additive is the aluminum salt of N-fatty beta-amino dipropionic acid.
7. the film of claim 1 wherein the added metal salt is the aluminum salt of N-fatty sarcosinic acid.
8. The film of claim 1 wherein the additive is the barium salt of N-fatty beta-imino dipropionic acid.
9. The film of claim 1 wherein the polymer is a plasticized polyvinylchloride film and the polyvalent salt is the aluminum salt of an N-fatty amino alkanoic acid.
10. The method enhancing the moisture vapor transmission properties of a polymeric material, which method comprises:

incorporating into a bulk polymeric material a small amount sufficient to enhance the MVT properties of the material of a water-insoluble polyvalent metal salt consisting essentially of metal cations of tin, lead, zinc, titanium, cadmium, aluminum, barium, and magnesium of an amphoteric amino carboxylic acid compound having the following general formula:

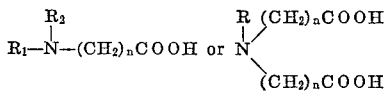

where $R_1$ is an alkyl or fatty acid radical, $R_2$ is a hydrogen atom or lower alkyl radical, and $n$ is an integer of from 0 to 6.

No references cited.

JOSEPH L. SCHOFER, *Primary Examiner.*

J. A. DONAHUE, *Assistant Examiner.*